(12) United States Patent
Toshiki et al.

(10) Patent No.: US 10,049,778 B2
(45) Date of Patent: Aug. 14, 2018

(54) ARRANGEMENT FOR GENERATING A PROTON BEAM AND AN INSTALLATION FOR TRANSMUTATION OF NUCLEAR WASTES

(71) Applicant: ECOLE POLYTECHNIQUE, Palaiseau (FR)

(72) Inventors: Tajima Toshiki, Foothill Ranch, CA (US); Gérard Mourou, Paris (FR); Sydney Gales, Verrieres le Buisson (FR)

(73) Assignee: ECOLE POLYTECHNIQUE, Palaiseau (FR)

( * ) Notice: Subject to any disclaimer, the term of this patent is extended or adjusted under 35 U.S.C. 154(b) by 465 days.

(21) Appl. No.: 14/428,552

(22) PCT Filed: Sep. 11, 2013

(86) PCT No.: PCT/EP2013/068838
§ 371 (c)(1),
(2) Date: Mar. 16, 2015

(87) PCT Pub. No.: WO2014/041031
PCT Pub. Date: Mar. 20, 2014

(65) Prior Publication Data
US 2015/0235722 A1 Aug. 20, 2015

(30) Foreign Application Priority Data

Sep. 14, 2012 (EP) ..................................... 12290303

(51) Int. Cl.
*G21G 1/10* (2006.01)
*G21G 4/02* (2006.01)
(Continued)

(52) U.S. Cl.
CPC ................. *G21G 1/10* (2013.01); *G21G 1/06* (2013.01); *G21G 4/02* (2013.01); *H01S 3/06754* (2013.01); *H01S 3/2383* (2013.01)

(58) Field of Classification Search
CPC ............... G21G 1/12; G21G 1/10; G21G 1/06
See application file for complete search history.

(56) References Cited

U.S. PATENT DOCUMENTS

| 5,160,696 A | 11/1992 | Bowman |
| 6,895,064 B2 * | 5/2005 | Ritter ....................... G21C 1/30 |
| | | 376/190 |

(Continued)

FOREIGN PATENT DOCUMENTS

WO    2007/034317 A2    3/2007

OTHER PUBLICATIONS

Yang et al., "Neutron production by fast protons from ultraintense laser-plasma interactions" Journal of Applied Physics, 96(11), Dec. 2004, pp. 6912-6918. (Year: 2004).*

(Continued)

*Primary Examiner* — Sharon M Davis
(74) *Attorney, Agent, or Firm* — Oliff PLC

(57) ABSTRACT

The invention relates to an arrangement for producing a proton beam. This arrangement is characterized in that it is constituted by a laser driven accelerator of protons adapted to produce a beam of relativistic protons of 0.5 GeV to 1 GeV with a current in the order of tens of mA, such as a current of 20 mA. The invention can be used for transmutating nuclear waste.

13 Claims, 3 Drawing Sheets

(51) Int. Cl.
  *H01S 3/067* (2006.01)
  *H01S 3/23* (2006.01)
  *G21G 1/06* (2006.01)

(56) References Cited

U.S. PATENT DOCUMENTS

| | | | | |
|---|---|---|---|---|
| 2002/0090194 | A1* | 7/2002 | Tajima | H05H 15/00 385/147 |
| 2002/0172317 | A1* | 11/2002 | Maksimchuk | G21G 1/10 376/190 |
| 2003/0138068 | A1* | 7/2003 | Buttsev | G21G 1/12 376/190 |

OTHER PUBLICATIONS

Mourou et al. "ICAN and 100GEV's Ascent," IZEST The International Center Zetta-Exawatt Science and Technology, EuroNNAc, pp. 1-60, May 3, 2012.

Bayaramian et al. "Power Scaling of Ti:Sapphire Amplifiers: Design of a High Average Power Femto-Petawatt Laser," IEEE, pp. 775-776, 2008.

Bourderionnet et al. "Collective Coherent Phase Combining of 64 Fibers," Optics Express, vol. 19, No. 18, pp. 17053-17058, Aug. 29, 2011.

Demoustier et al. "Coherent Beam Combining of 1.5 μm Er/Yb Doped Fiber Amplifiers," Fiber and Integrated Optics, pp. 392-406, 2008.

Mourou et al. "The Road to High Peak Power and High Average Power Lasers: Coherent-Amplification-Network (CAN)," American Institute of Physics, pp. 152-163, 2006.

* cited by examiner

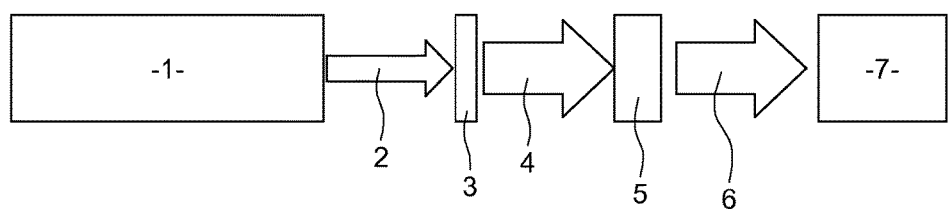
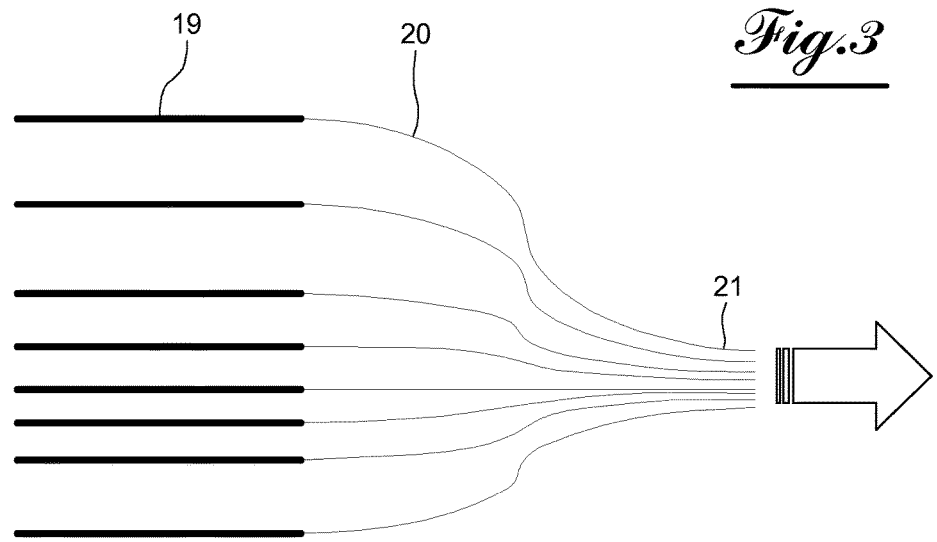

ARRANGEMENT FOR GENERATING A PROTON BEAM AND AN INSTALLATION FOR TRANSMUTATION OF NUCLEAR WASTES

The invention relates to an arrangement for generating a proton beam and an installation for transmutation of nuclear wastes, particularly from nuclear reactors.

It is known that the transmutation of nuclear wastes from nuclear reactors needs to deposit a large amount of neutrons and gamma photons on hazardous nuclear isotopes. The conventional approach is to use fast neutrons generated by fast breeding reactors or a dedicated high power and high energy accelerator to bombard a spallation heavy weight target to produce high flux of neutrons which will induce transmutation of these isotopes.

A conventional arrangement for transmutation of nuclear wastes has the short-comings that it is very bulky and expensive. Its size may exceed the one of the nuclear reactor itself.

The invention has the object to overcome these shortcomings.

For reaching this object, the arrangement proposed by the invention is characterized in that it is constituted by a laser driven accelerator of protons adapted to produce a beam of relativistic protons of 0.5 GeV to 1 GeV with a current in the order of tens of mA, such as a current of 20 mA.

According to a feature of the invention, the arrangement is characterized in that it comprises a laser pulse source adapted to produce a beam of short pulses having a duration of hundreds of femtoseconds and an intensity greater than $10^{23}$ W/cm$^2$ with a high-average power of the order of tens of MW and a proton target on which the laser beam is focused on.

According to another feature of the invention, the arrangement is characterized in that the duration of the laser pulses is in the order of 30 femtoseconds.

According to still another feature of the invention, the arrangement is characterized in that the high-average power is in the order of 20 MW.

According to still another feature of the invention, the arrangement is characterized in that it comprises a laser pulse oscillator producing ultra-short pulses having a duration in the order of tens of femtoseconds and an energy in the order of nanojoules and a single mode optical fiber amplifier device into which the produced laser pulses are fed in, comprising a multitude of optical fibers in view to form a coherent amplification network system.

According to still another feature of the invention, the arrangement is characterized in that said coherent amplification network system comprises a series of successive amplifier stages each comprising a bundle of single mode fiber amplifiers, in which the fibers are spaced from one another in view to allow passage of a cooling medium there between, the bundle of one stage comprising fibers which have been obtained by splitting of the fibers of the preceding stage bundle.

According to still another feature of the invention, the arrangement is characterized in that in the downward end the portion of the coherent amplification network, each fiber comprises two fiber sections, an amplifying fiber section belonging to the last amplifier stage in which the fibers are separated from one another for cooling reasons and a transport fiber section made of very low loss fiber, the transport fibers allowing to transform the great diameter bundle of the amplifier stage into a small diameter output bundle where the fibers are kept as close as possible from each other to make the overall output pupil diameter as reduced as possible.

According to still another feature of the invention, the arrangement is characterized in that the proton target is a solid target formed by a film of a substance such as hydrogen, helium or carbon.

According to still another feature, the laser pulses source is adapted to produce laser pulses having a repetition rate in the order of Khz, such as 10 KHz.

The installation for transmutation of nuclear wastes is characterized in that it comprises the arrangement for producing the beam of relativistic protons and a spallation target for producing a beam of neutrons of 0.5 GeV to 1 GeV, which is directed towards nuclear waste, said spallation target being irradiated by the ultra-relativistic proton beam.

In accordance to an advantageous feature, the spallation target is a liquid target of Pb—Bi.

According to another feature, the installation is characterized in that the spallation target comprises an entrance window of high-stress steel and a cylindrical tube filled by a liquid of Pb—Bi alloy, the liquid alloy being used as cooling medium.

Other features and advantageous of the invention will become apparent from the description given below which only serves as an example and is in no way limiting the scope of the invention, with references to the attached drawings, wherein:

FIG. 1 is a schematic diagram of an installation for transmutation of nuclear waste, according to the invention;

FIG. 3 is a schematic cross-section view of the optical fibers architecture of the transport fiber assembly along the line IV-IV of FIG. 2.

Figure 2:
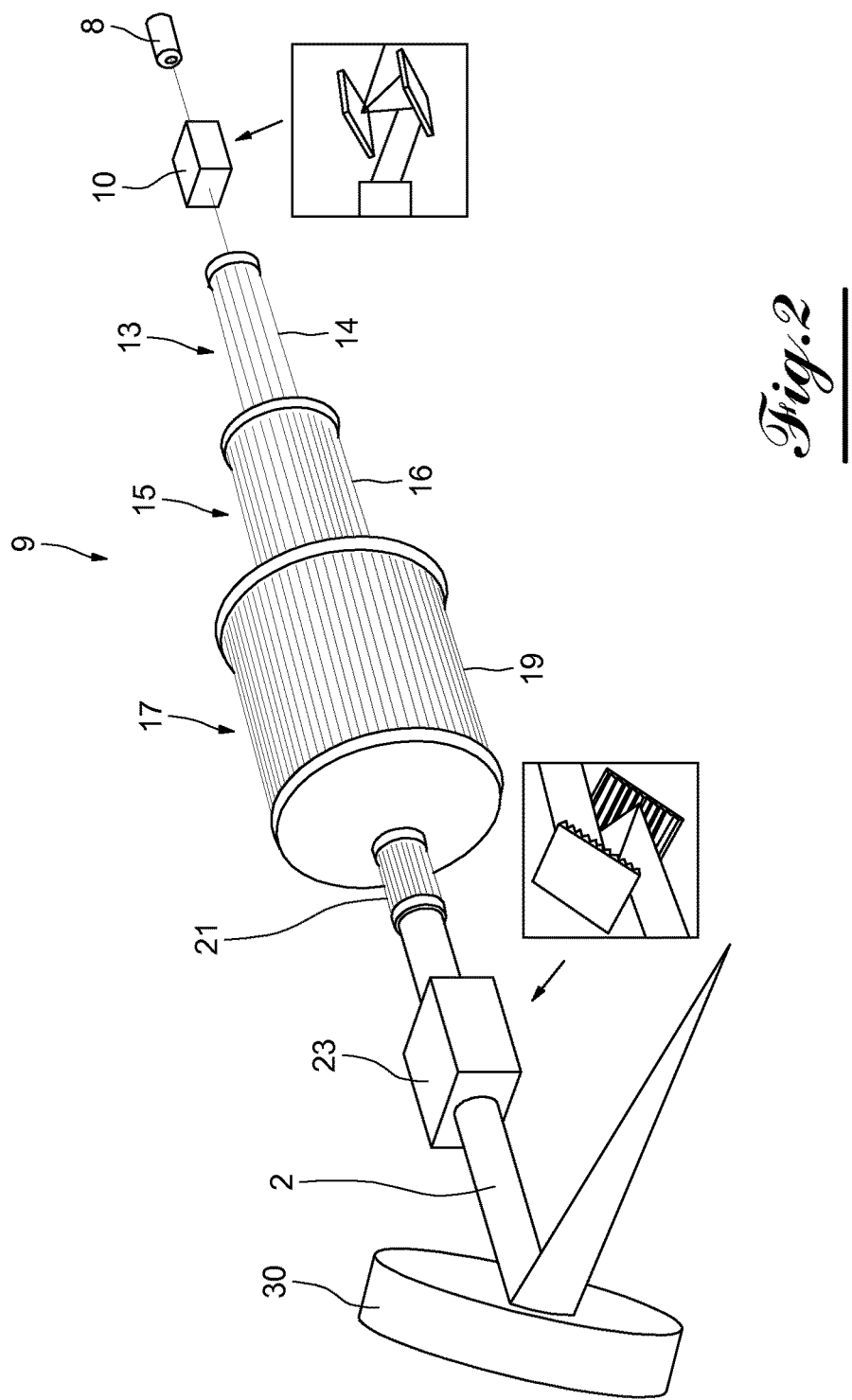
FIG. 2 is a view of an arrangement for producing a high-intensity and high-average beam of protons, according to the invention.

The invention will be described below in its application to transmutation of nuclear waste. This application however serves only as a non-exclusive example. It is to be noted that the invention covers all applications using a beam of relativistic protons obtained by the laser based method proposed by the invention.

As shown on FIG. 1, an installation for transmutating nuclear waste such as waste from nuclear reactors comprises an ultra-relativistic intensity pulse-laser source 1 susceptible to produce a laser beam 2 of ultra-short laser pulses having a duration of for instance 30 femtoseconds (fs) and an intensity greater than $10^{23}$ W/cm$^2$ with high-average power of the order of 20 MW, a proton target 3 on which the laser beam 2 is focused on and from which a beam of relativistic protons 4 of 0.5 GeV to 1 GeV with a current for instance of the order of 20 mA is produced. The latter irradiates a spallation target 5, for instance a liquid target of Pb—Bi where neutrons 6 of 0.5 to 1 GeV are spallated from. The neutrons are directed towards the nuclear waste 7 to be transmutated, such as spent nuclear fuel, in order to transmute the waste's radioactive isotope, i.e. lower actinides, into much safer materials or elements with significantly shorter half-lives.

Figure 4:
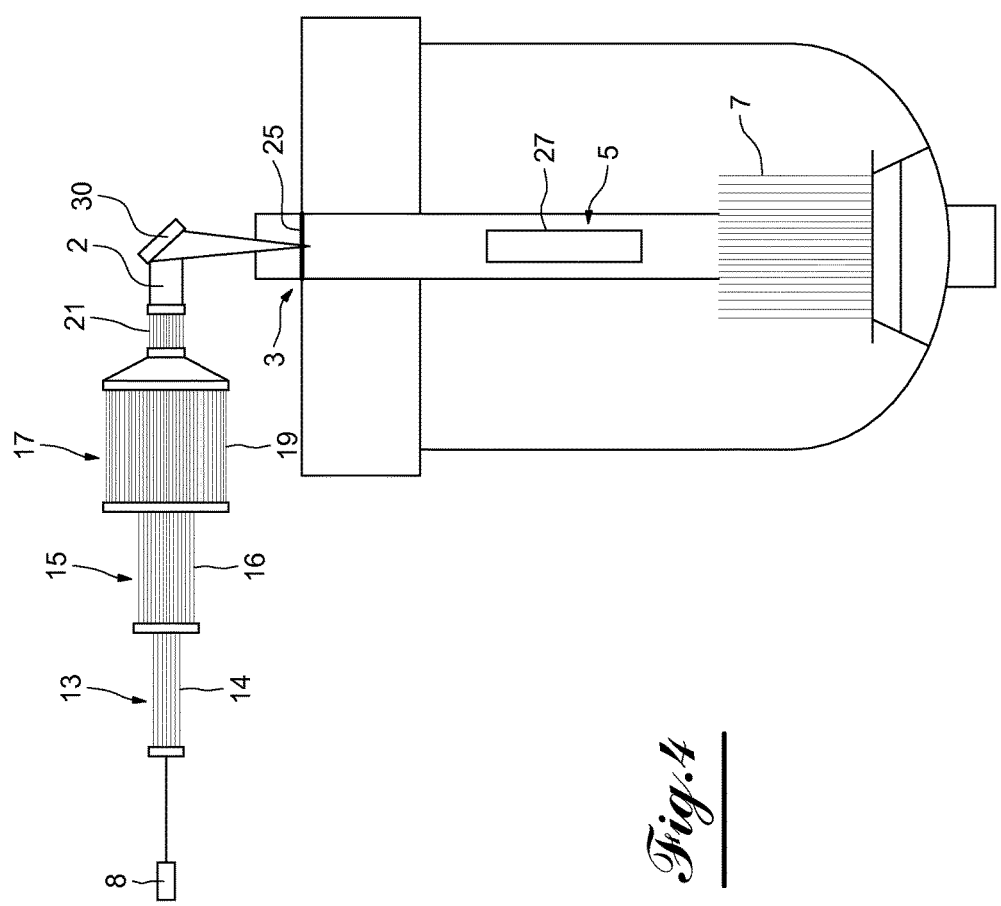
FIG. 4 shows an installation according to the invention for transmutating nuclear waste.

With reference to FIGS. 2 to 4, the ultra-relativistic intensity pulse-laser source 1 will be described here-below in a detailed manner.

As can be seen on FIG. 2, the source 1 comprises an oscillator 8 adapted to produce short pulses of for instance femtoseconds (fs) duration and energy in the order of nanojoule (nJ). The produced laser-pulse is fed into a single mode optical fiber amplifier arrangement comprising a multitude of optical fibers in view to form a coherent amplification network (CAN) system providing simultaneous high-peak and high-average powers with high efficiency greater than 30%, i.e. the laser beam 2 shown on FIG. 1 which may have an intensity greater than $10^{23}$ W/cm$^2$.

Concerning the coherent amplification network system reference is made to the publication "Euronnac, May 2012 Meeting CERN", IZEST, Ecole Polytechnique, Palaiseau of Gerard Mourou and Toshiki Tajima, and to the publication "Coherent Beam Combining of 1.5 µm Er Yb Doped Fiber Amplifiers", Fiber and Integrated Optics, 27(5) (2008) of S. Demoustier, C. Bellanger, A. Brignon and J. P. Huignard, and of "Collective Coherent Phase Combining of 64 fibers" Opt. Express, 19, Issue 18, 17053-17058 (2011) of J. Bourderionnet, C. Bellanger, J. Primot and A. Brignon.

More precisely, the laser-pulse produced by oscillator 8 passes through a pair of diffraction gratings 10 which are represented in form of a boxes the structure of which is precised beneath and which stretch it by about $10^5$ times in a manner known per se. The stretching separates the various components of the stretch pulse, producing a rainbow in time. The pulse after stretching is at the millijoule (mJ) level.

The stretched pulses are coupled in a first amplifier stage 13 to a multiplicity of for instance 10 to 100 fibers 14, each constituting a single mode fiber amplifier. Each fiber will amplify the input pulse to the millijoule level. The amplified fibers are kept to form a bundle wherein the amplifying fibers are at a relatively large distance from one another in order to allow efficient cooling by an appropriate cooling medium for evacuating heat produced by the fibers.

The same operation is repeated in a second amplifier stage 15 where each fiber amplifier of the first stage 13 feeds a multiplicity of for instance 10 to 100 single mode amplifiers 16 of the same type as the ones of the first stage. Each fiber will amplify the input, which is a corresponding part of the output of the fiber from which it is obtained by splitting, to the millijoule level.

The same process is repeated in successive series of amplifier stages, one of which is furthermore shown in 17 on FIG. 2 which comprises a larger diameter bundle of fibers 19 spaced from one another for enabling efficient cooling of the fibers.

It results from the foregoing that by splitting and branching each single "seed" pulse a matrix of thousands of lasers is obtained. In each stage of the successive series of amplifier stages, the phase of each pulse is preserved.

The very great number of fibers of the last stage, on FIG. 2 the stage 17, are combined and phased with one another so as to form a single pulse, which is compressed by a pair of gratings in a manner known per se. The pulse energy can be now of tens of Joules, the pulse duration corresponding to the initial pulse duration of 30 femtoseconds of the present example.

FIG. 3 shows the arrangement of the fibers in the region of the downward end of the fiber architecture. As can be seen, each fiber is realized in two sections, an amplifying section 19 and a transport section 20 made of very low loss fiber 21. The fiber amplifying sections 19 which constitute the last amplifier stage are arranged in a manner to form a great diameter bundle wherein the different sections are sufficiently separated from one another to ensure efficient cooling by means of an appropriate cooling medium. The fiber transport sections 20, since they are very low loss fibers which need no particular cooling allow to transform the great diameter bundle in a small diameter output bundle 21 where the fibers are kept as closed as possible from each other to make the overall output pupil diameter as reduced as possible.

The individual laser beams which get out at the ends of the small diameter fibers form a beam 22 of single pulse, after having been phase controlled to be in phase such as described in the before mentioned publication "Euronnac, May 2012, Meeting CERN, the teaching of which is considered to be included therein. Each amplified stretched output pulse is then compressed by means of a second pair of gratings 23 schematically shown on FIG. 2. The resulting pulse has the ultra-short duration of tens of femtoseconds such as of 30 femtoseconds of the original pulse produced by oscillator 9, but its energy is enormous of for instance 30 Joules.

Theses pulses are made to hit a parabolic mirror 30 which focuses it on the proton target 3 as can be seen on FIG. 4.

The resulting pulse is the high-average power and high-intensity pulse 2 shown on FIG. 1, which is in the ultra-relativistic regime, i.e. greater than $10^{23}$ W/cm$^2$.

According to FIGS. 1 and 3, these pulses 2 which can be produced at a repetition rate in the order of KHz for instance 10 kHZ, due to the efficient cooling of the single mode fiber amplifiers in their different bundles by means of an appropriate cooling medium, are made to shoot the proton target 3 which can be a solid target made of a substance such as hydrogen, helium and/or carbon, advantageously in form of a film 25. The shooting of the target produces the high-flux 4 of high-energy protons in the range of 0.5 to 1 GeV which is made to impinge on the spallation target 5 in order to be converted in the high-flux of fast energetic neutrons 6 by spallation process induced in the target 5 which is for instance a high-Z material target. It is to be noted that 1 GeV proton produces on the target about 30 neutrons which is a high multiplication factor.

The target 5 consists of an entrance window of high-stress steel and a cylindrical tube 27 of about 50 cm filled by a liquid Pb—Bi alloy for neutron production. This liquid alloy can be made to flow and circulate in a dedicated hydraulic circuit to maintain the temperature well below its critical value. Accordingly, the alloy is not only used for neutron production, but also as coolant.

By appropriate monitoring the corrosion and the stress in the entrance window as well as of the temperature gradient and the production of H and He in the target assembly, a safe operation of the system is insured.

In the conditions described above, the invention allows to produce efficient relativistic protons by shooting the solid target of hydrogen and/or helium within a laser at the density of greater than $10^{23}$ W/cm$^2$. In this radiation dominated pressure regime, the momentum is transferred to ions through the electric filled arising from charge separation. In this regime, the proton component moves forward with almost the same velocity as the average longitudinal velocity of the electron component and renders the interaction very efficient, close to 100%. Moreover, the proton energy is a desired energy range between 0.5 and 1 GeV to produce the neutrons with the high-energy in order to achieve the transmutation of the nuclear waste 7.

It results from the foregoing that the laser based way to produce neutrons to be directed toward a target of nuclear waste comprises an oscillator for producing ultra-short laser pulses in the order of femtoseconds having an energy in order of millijoules, very far from the level of tens of joules necessary for the targeted application of the invention, such as transmutation of nuclear waste. To this end, the invention proposes to combine a very large number, i.e. $10^4$ or more fibers coherently in the coherent amplification network system described above and shown on the figures. The repetition rate of the laser pulses having the intensity greater than $10^{23}$ W/cm$^2$ can be advantageously in the order of tens of kHZ due to the use of fibers having a high surface area and the heat removal ensured by the disposition of the fibers in large diameter fiber bundles wherein they are separated from one another to allow circulation of a cooling medium there between. Since the used single mode fiber amplifiers are the same in each amplifier stage, and are tested telecommunication components, the laser pulse generator arrangement and the installation for transmutating nuclear waste can be realized as relatively cheap and compact apparatus which can be moved to locations where it should be used.

The invention claimed is:

1. An arrangement for producing a proton beam of relativistic protons of 0.5 GeV to 1 GeV of energy, the arrangement comprising:
    a proton target, and
    a laser source focused on the proton target, configured to produce a beam of short pulses at an intensity greater than $10^{23}$ W/cm$^2$, the laser source comprising:
        an ultrashort pulse laser pulse oscillator for producing pulses, and
        a coherent amplification network system comprising a series of successive amplifier stages, each amplifier stage comprising:
            a bundle of single mode fiber amplifiers for amplifying the pulses produced by the laser pulse oscillator, each fiber amplifier comprising a plurality of optical fibers, the optical fibers being spaced from one another, and
            a cooling medium flowing between the fibers,
        wherein a bundle of one of the successive amplifier stages comprises optical fibers obtained by splitting of optical fibers of a preceding stage,
    the coherent amplification network system further comprising a downward end portion comprising a last amplifier stage comprising:
        an amplifying fiber section having optical fibers separated from each other to allow cooling of the optical fibers, and
        an output bundle section comprising a transport fiber section of a smaller diameter than the amplifying fiber section, comprising optical fibers of a loss lower than that of optical fibers of the amplifying fiber section.

2. The arrangement for producing a proton beam according to claim 1, wherein the current is about 20 mA.

3. The arrangement for producing a proton beam according to claim 1, wherein the current is about tens of mA.

4. The arrangement according to claim 1, wherein a duration of each laser pulse is about 30 femtoseconds.

5. The arrangement according to claim 1, wherein an average power is about 20 MW.

6. The arrangement according to claim 1, wherein the proton target is a solid target formed by a film of a substance.

7. The arrangement according to claim 1, wherein the laser pulse oscillator has a repetition rate of about 10 KHz.

8. An installation for transmutation of nuclear waste, comprising an arrangement for producing a proton beam according to claim 1, and a spallation target irradiated by the beam of relativistic protons for producing neutrons of 0.5 GeV to 1 GeV of energy by spallation, said neutrons being directed towards the nuclear waste to be transmuted.

9. The installation according to claim 8, wherein the spallation target is a liquid target.

10. The installation according to claim 9, wherein the spallation target comprises an entrance window of high-stress steel and a cylindrical tube filled by a liquid of Pb—Bi alloy, wherein said liquid alloy flows and circulates in a dedicated hydraulic circuit to cool the installation.

11. The installation according to claim 8, wherein a duration of each laser pulse is about 30 femtoseconds.

12. The installation according to claim 8, wherein an average power is about 20 MW.

13. A method for transmutating nuclear waste, comprising:
    producing a proton beam, using an arrangement according to claim 1,
    irradiating a spallation target with said proton beam so that neutrons of 0.5 GeV to 1 GeV are spallated from said spallation target,
    directing said neutrons spallated from said spallation target towards said nuclear waste so as to transmute said nuclear waste.

* * * * *